(12) United States Patent
Miyata (10) Patent No.: US 10,833,752 B2
(45) Date of Patent: Nov. 10, 2020

(54) WIRELESS COMMUNICATION SYSTEM, RELAY STATION, AND RELAY METHOD

(71) Applicant: KYOCERA Corporation, Kyoto (JP)

(72) Inventor: Takeo Miyata, Toyonaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/228,545

(22) Filed: Dec. 20, 2018

(65) Prior Publication Data

US 2019/0115969 A1 Apr. 18, 2019

Related U.S. Application Data

(63) Continuation of application No. PCT/JP2017/022806, filed on Jun. 21, 2017.

(30) Foreign Application Priority Data

Jun. 23, 2016 (JP) ................................. 2016-124771

(51) Int. Cl.
| | |
|---|---|
| H04B 7/08 | (2006.01) |
| H04W 16/26 | (2009.01) |
| H04W 16/28 | (2009.01) |
| H04B 7/06 | (2006.01) |
| H04B 7/155 | (2006.01) |

(Continued)

(52) U.S. Cl.
CPC ......... *H04B 7/0868* (2013.01); *H04B 7/0691* (2013.01); *H04B 7/0874* (2013.01); *H04B 7/1555* (2013.01); *H04B 7/15507* (2013.01); *H04W 16/26* (2013.01); *H04W 16/28* (2013.01);

(Continued)

(58) Field of Classification Search
CPC .. H04B 7/0868; H04B 7/1555; H04B 7/0691; H04B 7/0874; H04B 7/15507; H04W 16/28; H04W 16/26; H04W 88/14; H04W 88/12; H04W 24/10; H04W 76/15; H04W 84/047; H04W 24/08
See application file for complete search history.

(56) References Cited

U.S. PATENT DOCUMENTS

| | | | | |
|---|---|---|---|---|
| 2010/0087216 A1* | 4/2010 | Ko | .................. | H04W 92/20 455/500 |
| 2012/0003925 A1* | 1/2012 | Coldrey | ............... | H04B 7/1555 455/7 |

(Continued)

FOREIGN PATENT DOCUMENTS

| | | |
|---|---|---|
| JP | 2012-195858 A | 10/2012 |
| JP | 2014-216758 A | 11/2014 |
| JP | 2014-233004 A | 12/2014 |

*Primary Examiner* — Jae Y Lee (74) *Attorney, Agent, or Firm* — Studebaker & Brackett PC (57) ABSTRACT

A wireless communication system includes: a plurality of base stations wirelessly connected to a relay station; and the relay station comprising: a multi-element antenna including a plurality of antenna elements, wherein, among the plurality of antenna elements, a first antenna element is wirelessly connected to a first base station of the plurality of base stations, and a second antenna element is wirelessly connected to a second base station of the plurality of base stations; and a controller that switches at least one of the first antenna element and the second antenna element so as to be wirelessly connected to another base station of the plurality of base stations in response to an occurrence of an event.

12 Claims, 5 Drawing Sheets

(51) Int. Cl.
*H04W 76/15* (2018.01)
*H04W 24/10* (2009.01)
*H04W 88/12* (2009.01)
*H04W 88/14* (2009.01)

(52) U.S. Cl.
CPC ........... *H04W 24/10* (2013.01); *H04W 76/15* (2018.02); *H04W 88/12* (2013.01); *H04W 88/14* (2013.01)

(56) References Cited

U.S. PATENT DOCUMENTS

| 2012/0236955 A1* | 9/2012 | Zhou | H04B 7/0802 |
| | | | 375/267 |
| 2015/0236777 A1* | 8/2015 | Akhtar | H04W 48/20 |
| | | | 455/438 |

\* cited by examiner

|  | BASE STATION 201 | BASE STATION 202 | BASE STATION 203 |
|---|---|---|---|
| ANTENNA 121 | 4 | 3 | 2 |
| ANTENNA 122 | 3 | 4 | 2 |
| ANTENNA 123 | 2 | 2 | 4 |

FIG.6

| NO | COMBINATION | USED ANTENNA 1 | USED ANTENNA 2 |
|---|---|---|---|
| 1 | BASE STATION 201 + BASE STATION 202 | ANTENNA 121 (4) | ANTENNA 122 (4) |
| 2 | BASE STATION 202 + BASE STATION 203 | ANTENNA 122 (4) | ANTENNA 123 (4) |
| 3 | BASE STATION 201 + BASE STATION 203 | ANTENNA 121 (4) | ANTENNA 123 (4) |

FIG.7

WIRELESS COMMUNICATION SYSTEM, RELAY STATION, AND RELAY METHOD

CROSS-REFERENCE TO RELATED APPLICATION

This is a Continuation Application of PCT Application No. PCT/JP17/022806, filed on Jun. 21, 2017, which was published under PCT Article 21(2) in Japanese. This application is based upon and claims the benefit of priority from Japanese Patent Application No. 2016-124771, filed on Jun. 23, 2016, the entire contents of which are incorporated herein by reference.

TECHNICAL FIELD

The present disclosure relates to a wireless communication system, a relay station, and a relay method for performing wireless communication.

BACKGROUND ART

In the fifth generation system which has been studied as a further development of a wireless communication system, it is inevitable to use small cells for reducing the communication area as measures for further improving throughput and increasing frequency utilization efficiency.

If small cells are introduced, the small cells exist throughout the city, so that the number of small cells drastically increases. In a case where the system is configured with only small cells, laying of wired lines (optical cables or the like) for connecting small base stations or relay stations to base stations of the master station is difficult in terms of cost and construction. Therefore, wirelessization (wireless backhaul) of a line connecting a small base station or a relay station to a base station of a master station has been considered.

At present, a wireless backhaul device is used in areas such as isolated islands and depopulated areas that are not reachable by wired lines. However, in order to reduce the laying cost of the lines, the use of the wireless backhaul device is planed for use in urban areas and the like (for example, JP-A-2014-216758). In addition, since work of laying the line to connect to the network is unnecessary, it is possible to expand the communication area in a form having a degree of freedom.

SUMMARY

In a wireless backhaul device, a relay station can be wirelessly connected to a plurality of base stations, but it is required that the relay station appropriately perform connection to the base stations.

The present disclosure provides a wireless communication system, a relay station, and a relay method, capable of appropriately performing connection to base stations depending on various situations.

A wireless communication system in the present disclosure includes a plurality of base stations wirelessly connected to a relay station; and the relay station comprising: a multi-element antenna including a plurality of antenna elements, wherein, among the plurality of antenna elements, a first antenna element is wirelessly connected to a first base station of the plurality of base stations, and a second antenna element is wirelessly connected to a second base station of the plurality of base stations; and a controller that switches at least one of the first antenna element and the second antenna element so as to be wirelessly connected to another base station of the plurality of base stations in response to an occurrence of an event.

The controller of the wireless communication system in the present disclosure may include a plurality of sets in which the antenna element and the base station are associated with each other, and may switch from a currently wirelessly connected set to another set in response to the occurrence of the event.

The controller of the wireless communication system in the present disclosure may determine the set according to a measurement result of surrounding wireless communication of the relay station.

The controller of the wireless communication system in the present disclosure may associate one base station and an antenna element with the best measurement result of the one base station as the set.

The controller of the wireless communication system in the present disclosure may associate the base station and the antenna element, which do not cause congestion or interference, as the set.

The controller of the wireless communication system in the present disclosure may associate the base station and the antenna element as the set based on past data.

A relay station in the present disclosure includes a multi-element antenna including a plurality of antenna elements, a wireless communication unit in which, among the plurality of the antenna elements, a first antenna element is wirelessly connected to a first base station and a second antenna element is wirelessly connected a second base station, and a controller which switches at least one of the first antenna element and the second antenna element so as to be connected to another base station in response to an occurrence of an event.

A relay method in the present disclosure is a relay method of a relay station, the relay station including a multi-element antenna including a plurality of antenna elements, and a wireless communication unit in which, among the plurality of the antenna elements, a first antenna element is wirelessly connected to a first base station and a second antenna element is wirelessly connected to a second base station, the method including switching at least one of the first antenna element and the second antenna element so as to be connected to another base station in response to an occurrence of an event.

The present disclosure provides a wireless communication system, a relay station, and a relay method, capable of appropriately performing connection to base stations depending on various situations.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, the present embodiment will be described with reference to the drawings.

Figure 1:
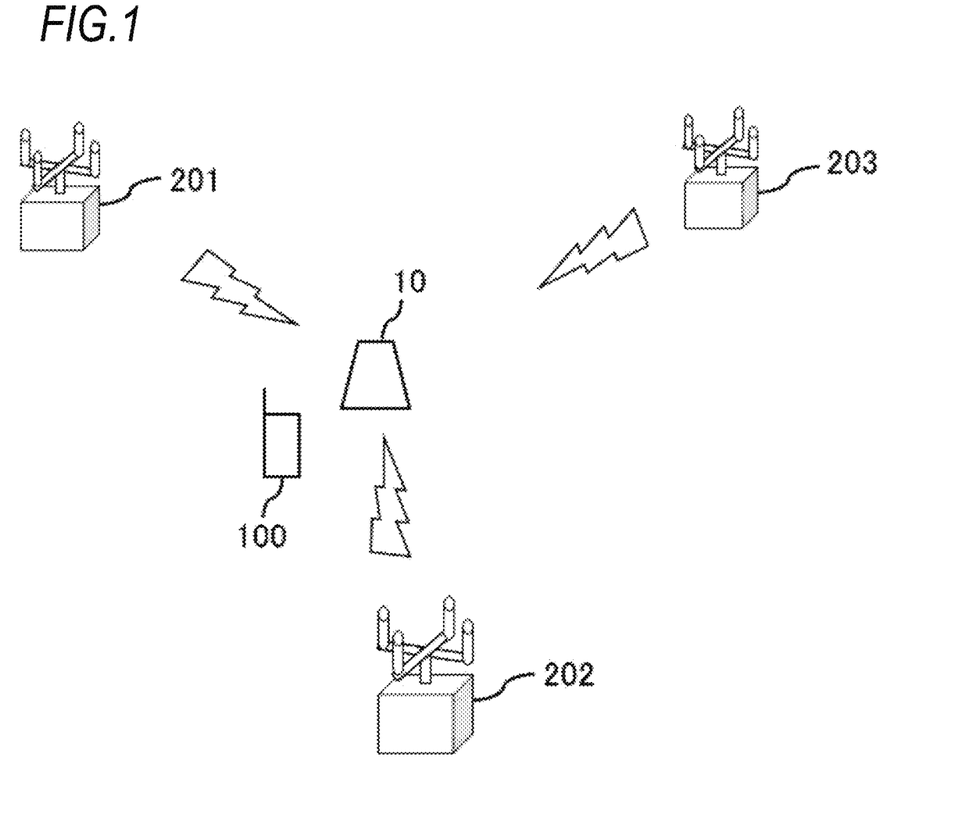
FIG. 1 is a diagram illustrating a wireless communication system according to the present embodiment.

FIG. 1 is a diagram illustrating a wireless communication system according to the present embodiment.

The wireless communication system according to the present embodiment is configured to include a relay station 10, a wireless terminal 100, a base station 201, a base station 202, and a base station 203. In the case of distinguishing the base stations from each other, the base stations are expressed as the base station 201, the base station 202, the base station 203, and in the case of not distinguishing the base stations from each other, the base stations are described as base stations 20.

The relay station 10 wirelessly communicates with the wireless terminal 100 and relays communicated data to at least one or more base stations 20 among the base station 201, the base station 202, and the base station 203. As viewed from the wireless terminal 100, the relay station 10 operates as a base station, but the relay station 10 and each base station 20 are wirelessly connected to each other.

The relay station 10 is a wireless communication apparatus that enables wireless communication within a narrow area, so-called a small cell. The small cells include microcells, picocells, femtocells and the like. The relay station 10 is expected to be installed everywhere in town in the future.

The base stations 20 are connected to a backbone network by a wired line (optical cable or the like). The base stations 20 are base stations that enable wireless communication within a wide area, so-called a large cell (macro cell). The base stations 20 may be installed on top of a building or the like.

The wireless terminal 100 can wirelessly communicate with the relay station 10. Although the wireless terminal 100 can wirelessly communicate with the base stations 20, an example where the wireless terminal 100 wirelessly communicates with the relay station 10 is described in the present embodiment.

The wireless communication system that introduces such wireless backhaul is used for areaization of a region where a wired line cannot be installed, countermeasures against communication trouble at the time of a disaster, temporary use such as an event, provisional use waiting for opening an optical line, and the like, so that reliability and the like are emphasized, throughput and cost are not prioritized and, in many cases, the cost is high.

Therefore, when the application of a wireless backhaul device is considered for the purpose of reducing the running cost by substituting the above-mentioned wired line, the device is very often not suitable in terms of cost. For example, since initial investment such as equipment cost and installation work cost is too high, even though the running cost is subsequently reduced, the trade-offs may not match. In addition, if wirelessization is done by the backhaul, in many cases, the reliability or the communication quality is often deteriorated as compared with the case of the wired line.

Therefore, when a plurality of base stations of the master station which is an accommodation destination of the wireless backhaul line are arranged and the wireless backhaul line becomes unusable due to various factors such as change of wireless environment, congestion of user data and malfunction of equipment, mesh connection in which the relay station is connected to all the base stations of the surrounding master stations is effective for solving this problem. However, in the mesh connection in which the relay station is connected to all the base stations of the surrounding master stations, since the corresponding traffic is processed for each connection, the processing load of the relay station becomes high, and thus, the utilization efficiency of the wireless line is not good.

Therefore, in the present embodiment, a wireless communication system, a relay station, and a relay method are described in which the relay station can appropriately perform connection to base stations depending on various situations.

Subsequently, the configuration of the relay station 10 according to the present embodiment will be described with reference to the drawings.

Figure 2:
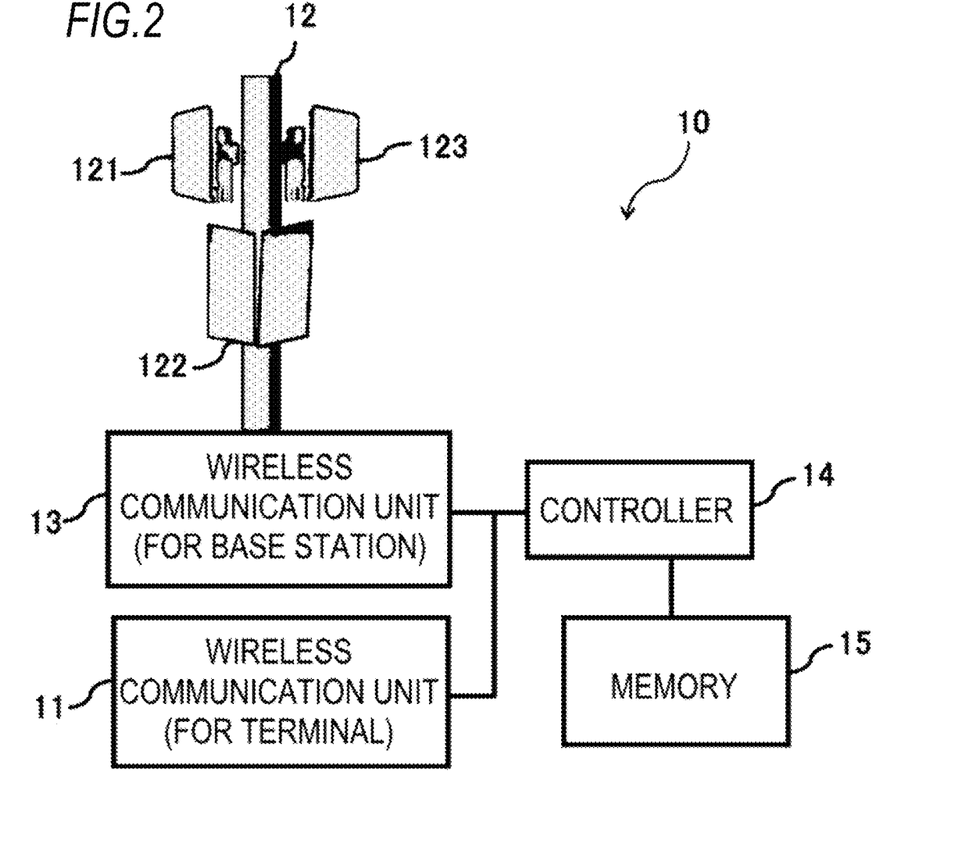
FIG. 2 is a block diagram of a relay station according to the embodiment.

FIG. 2 is a block diagram of the relay station according to the embodiment.

The relay station 10 is configured to include a wireless communication unit 11, a multi-element antenna 12, a wireless communication unit 13, a controller 14, and a memory 15.

The wireless communication unit 11 is configured to wirelessly communicate with the wireless terminal 100. The wireless communication unit 11 is configured to output information transmitted from the wireless terminal 100 to the controller 14 and to transmit the information output from the controller 14 to the wireless terminal 100.

The multi-element antenna 12 is configured with an antenna element 121, an antenna element 122, and an antenna element 123. The multi-element antenna 12 can perform wireless communication with surrounding base stations 20 for each antenna element.

The multi-element antenna 12 may be a multi-element antenna for small cells for practical application of a fifth generation mobile communication system. The multi-element antenna 12 may include beam control of the antenna. The multi-element antenna 12 may realize high frequency utilization efficiency by beam formation with high accuracy.

The multi-element antenna 12 may have an AAS (Active Antenna System) or may be used in the outdoor/indoor environment.

Figure 3:
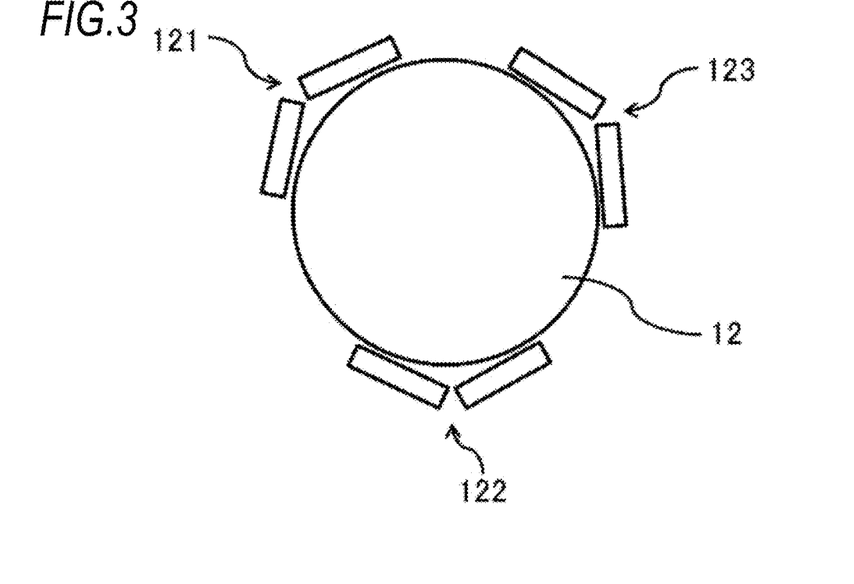
FIG. 3 is a diagram illustrating a structure of a multi-element antenna according to the embodiment.

FIG. 3 is a diagram illustrating a structure of the multi-element antenna according to the present embodiment. FIG. 3 is a diagram of the multi-element antenna 12 as viewed from the sky. The antenna element 121, the antenna element 122, and the antenna element 123 are arranged in respective directions so that the relay station 10 can be connected to the surrounding base stations 20 with a mesh.

Although three antenna elements are illustrated, the number of antenna elements is not limited to three. The respective antenna elements may be arranged in all directions. A wide range of service areas can be provided by arranging many antenna elements having different directionalities. By coping with not only the horizontal direction but also the elevation angle and depression angle, service areas can be provided upward and downward.

The wireless communication unit 13 is configured to wirelessly communicate with the base station 20 through the multi-element antenna 12. The wireless communication unit 13 is configured to output the information transmitted from the base station 20 to the controller 14 and to transmit the information output from the controller 14 to the base station 20. For example, the wireless communication unit 13 may be a wireless communication chipset.

The controller 14 is configured to control the wireless communication unit 11 and the wireless communication unit 13, as well as to output the information output from the wireless communication unit 11 to the wireless communication unit 13 and to output the information output from the wireless communication unit 13 to the wireless communication unit 11. For example, the controller 14 may be a CPU (Central Processing Unit).

The memory 15 stores various kinds of information such as various programs and surrounding wireless communication situations investigated by the relay station 10. The memory 15 may include a high-speed random access memory. The memory 15 may include a non-volatile memory. The memory 15 may include one or a plurality of magnetic disk storage devices. The memory 15 may include a flash memory device. The memory 15 may include other non-volatile solid-state memory devices.

The details of the process executed by the controller 14 will be described below as operations of the relay station 10.

Subsequently, the operations of the relay station 10 according to the present embodiment will be described with reference to the drawings.

Figure 4:
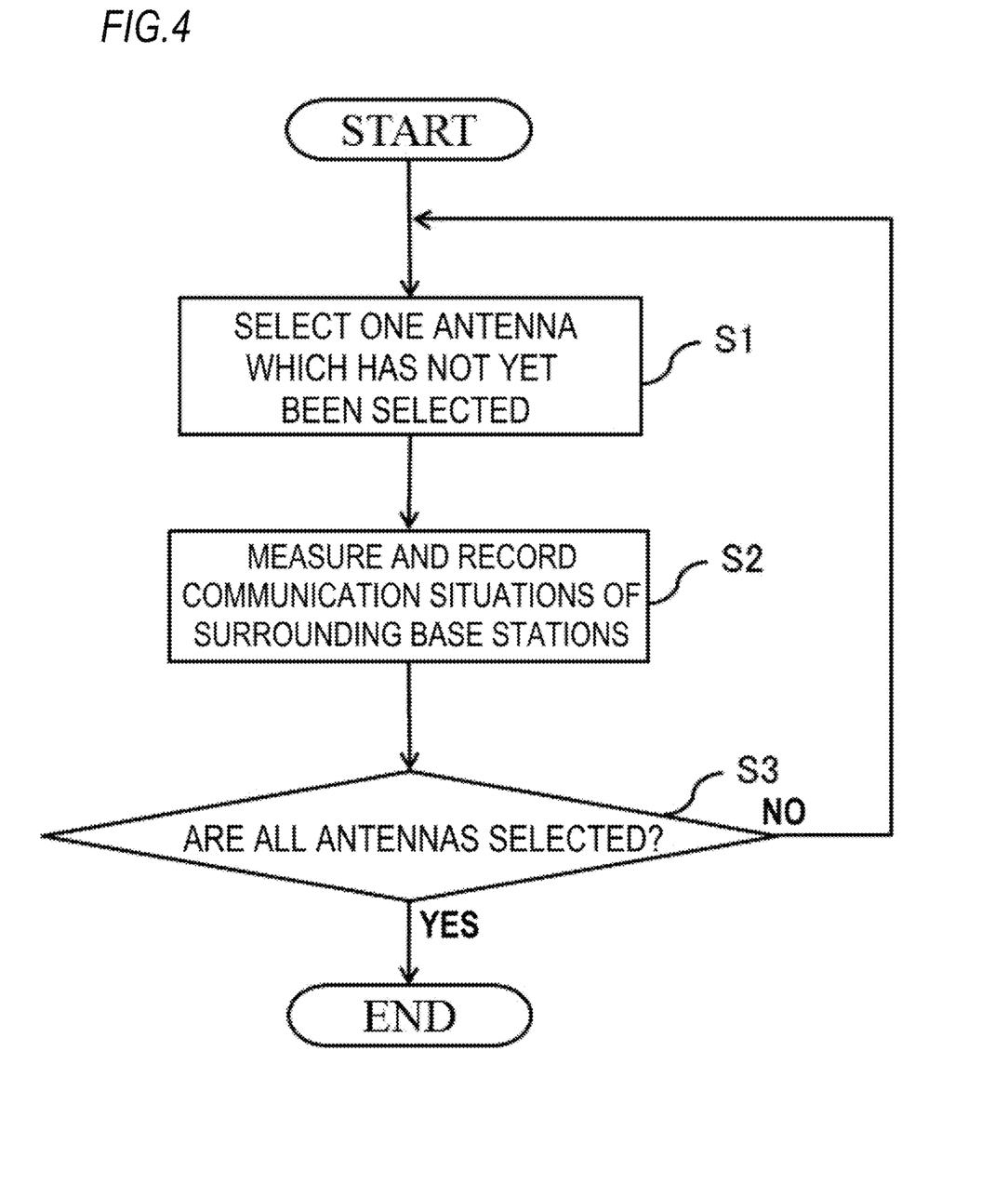
FIG. 4 is a flowchart of a process in which the relay station according to the embodiment investigates surrounding wireless communication situations.

FIG. 4 is a flowchart of a process in which the relay station according to the embodiment investigates the surrounding wireless communication situations. This process is executed at the time of activation of the relay station 10, periodically, or the like.

First, the relay station 10 selects an antenna element of the multi-element antenna 12 which has not yet been selected (step S1).

Next, the relay station 10 measures the communication situations of the surrounding base stations 20 by using the selected antenna element and records the measured communication situation in the memory 15 (step S2).

For example, if the selected antenna element is the antenna element 121, the relay station 10 measures the communication situation with the base station 201, the base station 202, and the base station 203 by using the antenna element 121. The communication situation may be any one of a received signal strength indicator (RSSI), a signal-noise ratio (SNR), interference and the like which indicate communication situations. The relay station 10 may measure communication situations of a control channel from the base stations 20 in a radio signal.

The relay station 10 determines whether or not all the antenna elements of the multi-element antenna 12 have been selected (step S3). In a case where all the antenna elements have been selected, the process is ended. In a case where all the antenna elements have not been selected, the process from step S1 is repeated.

The relay station 10 may not take the initiative to investigate the surrounding wireless communication situations, but the base stations 20 may take the initiative to investigate the surrounding wireless communication situations of the relay station 10.

Figure 5:
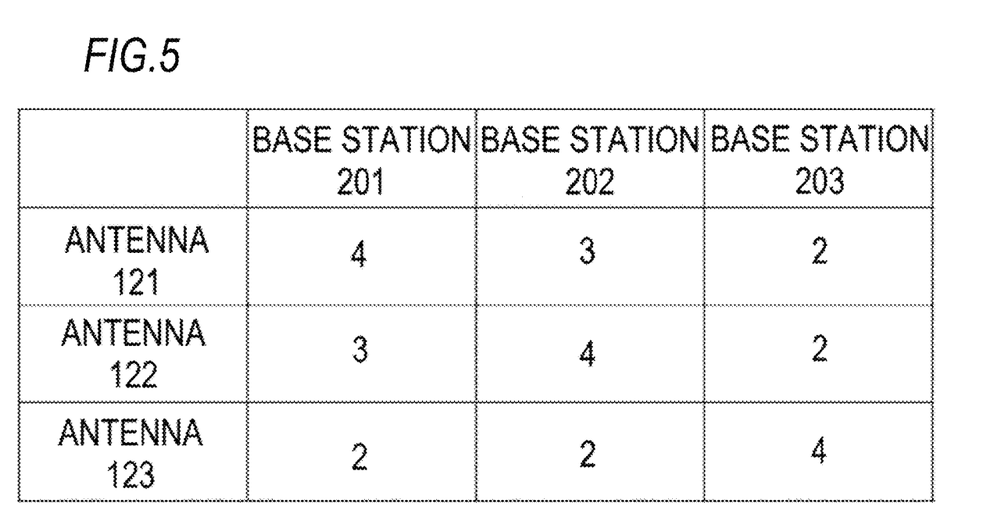
FIG. 5 is a diagram illustrating wireless communication situations between antenna elements and surrounding base stations according to the embodiment.

FIG. 5 is a diagram illustrating wireless communication situations of each antenna element and surrounding base stations according to the present embodiment. The wireless communication situations in FIG. 5 are obtained by the process described in FIG. 4. The wireless communication situations of FIG. 5 may be created by either of the controller 14 or the wireless communication unit 13.

For example, in the antenna element 121, a wireless communication situation in which the measurement result of the base station 201 is 4, the measurement result of the base station 202 is 3, and the measurement result of the base station 203 is 2 is obtained. Herein, the measurement results of 4, 3, 2, and the like are multiples of a certain reference value. The larger the numerical value is, the better the wireless communication situation is. The wireless communication situation may be substituted by RSSI or the like.

Figure 6:
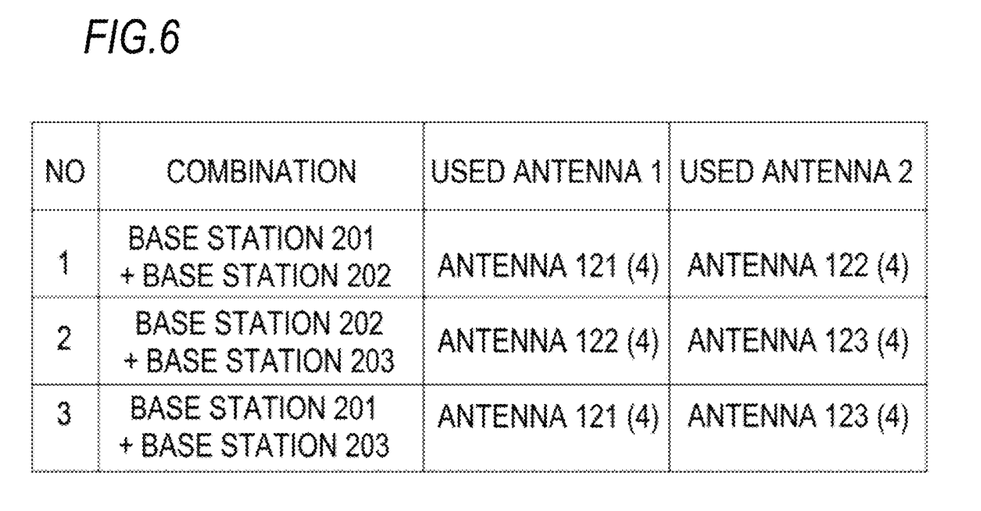
FIG. 6 is a diagram illustrating antenna elements used when the relay station is connected to a plurality of surrounding base stations.

FIG. 6 is a diagram illustrating antenna elements used in a case where the relay station 10 is connected to a plurality of surrounding base stations 20. Herein, an example where the relay station 10 is connected to two base stations 20 is described. If the relay station 10 is connected to the plurality of base stations 20 in this manner, when there is such a problem that one base station 20 cannot be used, it is possible to use another base station 20, or it is possible to transmit information to the base stations 20 with a low load while monitoring the load distribution of the base stations 20. In FIG. 6, a combination of two base stations 20 is used. However, one combination or two or more combinations may be used.

When the relay station 10 is connected to the base station 201 and the base station 202, the relay station 10 uses the antenna element 121 (measurement result is 4) having the best measurement result of the base station 201, and the antenna element 122 (measurement result is 4) having the best measurement result of the base station 202.

When the relay station 10 is connected to the base station 202 and the base station 203, the relay station 10 uses the antenna element 122 (measurement result is 4) having the best measurement result of the base station 202, and the antenna element 123 (measurement result is 4) having the best measurement result of the base station 203.

When the relay station 10 is connected to the base station 201 and the base station 203, the relay station 10 uses the antenna element 121 (measurement result is 4) having the best measurement result of the base station 201, and the antenna element 123 (measurement result is 4) having the best measurement result of the base station 203.

In the example illustrated in FIG. 6, the antenna elements with the best measurement results are selected. However, it is not limited to the best measurement results. Although one antenna element corresponds to one base station, a plurality of antenna elements may correspond to one base station.

A set of the antenna element and the base station 20 is not necessarily selected even if the measurement result is good, and the set, in which wireless communication between the relay station 10 and the base stations 20 does not cause congestion or interference may be selected. The set of the base station 20 and the antenna elements that is optimal for the day of the week, the date and time, or the date may be determined based on the past data, and the relay station 10 may select an antenna element and a base station 20 corresponding to the determined set.

Figure 7:
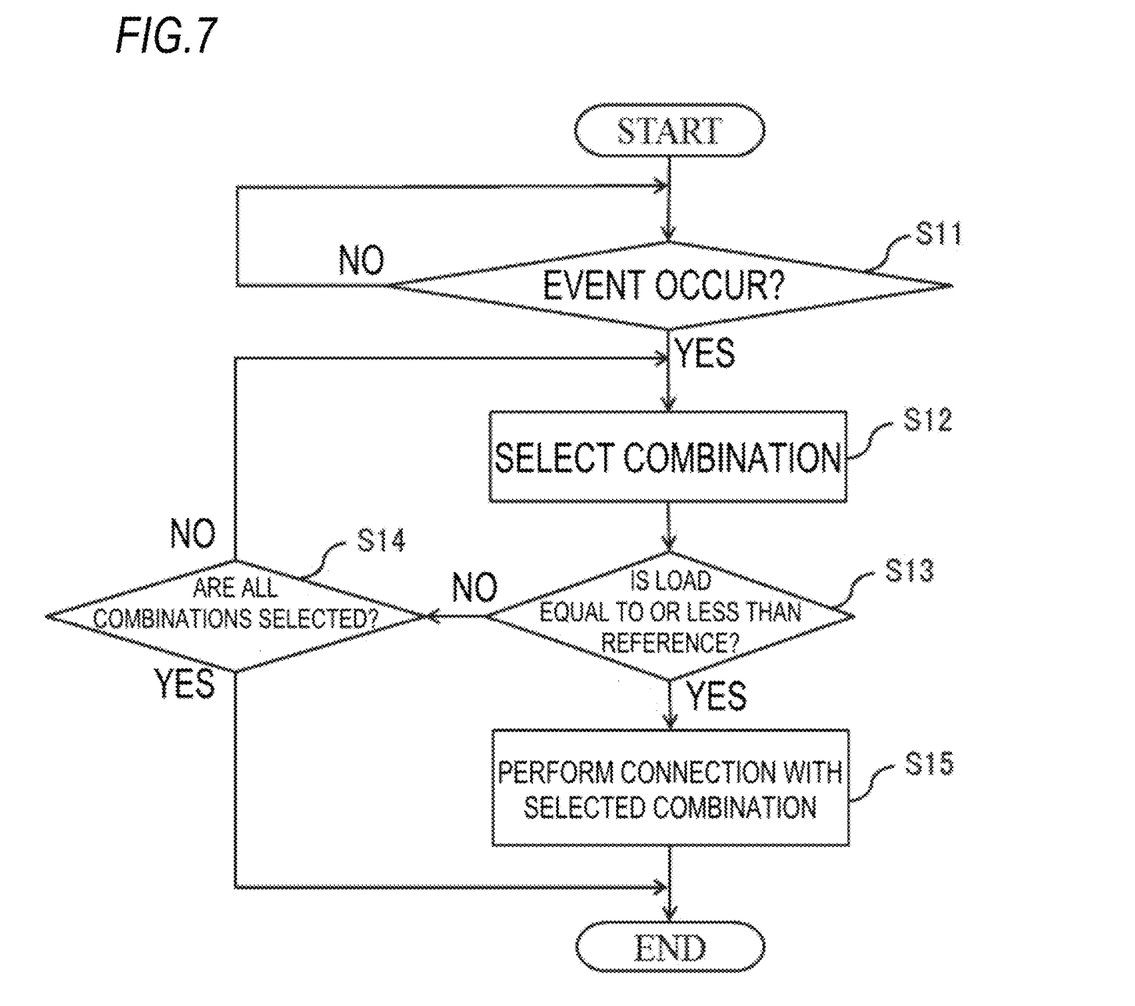
FIG. 7 is a flowchart of a process in which the relay station according to the embodiment is connected to a base station.

FIG. 7 is a flowchart of a process in which the relay station 10 according to the embodiment is connected to the base station 20. Before this process, it is assumed that the relay station 10 has already performed connection to some combinations among the combinations of the base stations 20 as described in FIG. 6.

First, it is determined whether or not an event for prompting change of the combination of the currently connected two base stations 20 has occurred (step S11). This event is an occurrence of malfunction or a high processing load in either or both of the two currently connected base stations 20, a deterioration in communication state of either or both of the two currently connected base stations 20, a periodic switching timing, or the like.

This event may be a predetermined time. This event may be a predetermined day of the week. This event may be based on an interference amount or power consumption of the relay station 10. This event may be based on a combination of the interference amount and the power consumption of the relay station 10.

Next, in a case where it is determined that an event prompting change of the combination of the currently connected two base stations 20 has occurred (YES in step S11), the relay station 10 selects a combination different from the currently used combination among the combinations of the base stations 20 described in FIG. 6 (step S12).

The relay station 10 checks whether the processing loads of both of the selected two base stations 20 are equal to or less than the reference (step S13). The relay station 10 may check whether there is malfunction or a problem in the communication state instead of the processing load.

In a case where the processing loads of both the selected two base stations 20 exceeds the reference or there is malfunction or a problem in the communication state (No in step S13), the relay station 10 determines whether or not all the combinations are selected (step S14). In a case where all the combinations have been selected, the process ends. In a case where all the combinations have not been selected, the processes from step S12 are repeated. Also, in the case where all the combinations are selected, the connection may be executed with the combination of the two base stations 20 having the smallest processing load among all the selected combinations.

In a case where the processing loads of both the selected two base stations 20 are equal to or less than the reference (YES in step S13), the relay station 10 executes connection with the selected combination (step S15). In step S15, in a case where there is no malfunction or the communication state instead of the processing load, the relay station 10 may connect to the selected combination.

As described above, the wireless communication system according to the present embodiment is to provide the relay station 10, the wireless communication system, the relay station, and the relay method, capable of appropriately selecting the combination of the base stations to which the relay station is connected, depending on various situations.

The relay station 10 can also reduce the load and interference of the relay station 10 and the load and interference of the base station 20 by appropriately selecting the antenna element corresponding to the base station.

It is necessary to perform correction (calibration) of the phase or amplitude deviation between the respective antenna elements of the relay station 10, and precise adjustment is necessary before product shipment. When the relay station investigates the surrounding wireless communication situations, it is also possible to determine the set of the antenna element and the base station 20 and to and reflect the calibration correction. Accordingly, the calibration before product shipment becomes unnecessary.

This application is based on Japanese Patent Application (Japanese Patent Application No. 2016-124771) filed on Jun. 23, 2016, and the entire contents of which are incorporated herein by reference.

The present disclosure can provide a wireless communication system, a relay station, and a relay method, capable of appropriately performing connection to base stations depending on various situations.

What is claimed is:

1. A wireless communication system comprising:
a plurality of base stations wirelessly connected to a relay station; and
the relay station comprising:
a multi-element antenna including a plurality of antenna elements; and
a controller, the controller configured to:
wirelessly connect a first antenna element, among the plurality of antenna elements, to a first base station of the plurality of base stations,
wirelessly connect a second antenna element, being different from the first antenna element among the plurality of antenna elements, to a second base station being different from the first base station of the plurality of base stations, and
wirelessly connect, at least one of the first antenna element wirelessly connected to the first base station and the second antenna element wirelessly connected to the second base station, to another base station of the plurality of base stations in response to an occurrence of an event.

2. The relay station according to claim 1, comprising
a terminal wireless communication unit connected to the controller and connected to a base station wireless communication unit, wherein the terminal wireless communication unit communicates with a terminal, and wherein the controller controls communication between the terminal and a base station of the plurality of base stations through the base station wireless communication unit.

3. The wireless communication system according to claim 1, wherein
the controller determines a plurality of sets, wherein each set of the plurality of sets comprises one or more antenna elements of the plurality of antenna elements associated with one or more base stations of the plurality of base station, and switches from a currently wirelessly connected set of the plurality of sets to another set of the plurality of sets in response to the occurrence of the event.

4. The wireless communication system according to claim 2, wherein
the controller determines the plurality of sets, according to a measurement result of surrounding wireless communication of the relay station.

5. The wireless communication system according to claim 3, wherein
for at least one set of the plurality of sets, the controller associates one base station of the plurality of base stations and an antenna element of the plurality of antenna elements based on a best measurement result.

6. The wireless communication system according to claim 3, wherein
for at least one set of the plurality of sets, the controller associates one base station of the plurality of base stations and an antenna element of the plurality of antenna elements which do not cause congestion or interference.

7. The wireless communication system according to claim 3, wherein
for at least one set of the plurality of sets, the controller associates one base station of the plurality of base stations and an antenna element of the plurality of antenna elements based on past data.

8. A relay station comprising:

a multi-element antenna including a plurality of antenna elements; and a controller of the relay station, the controller configured to:

wirelessly connect a first antenna element, among the plurality of antenna elements, to a first base station of the plurality of base stations, wirelessly connect a second antenna element, being different from the first antenna element among the plurality of antenna elements, to a second base station being different from the first base station of the plurality of base stations, and wirelessly connect, at least one of the first antenna element wirelessly connected to the first base station and the second antenna element wirelessly connected to the second base station, to another base station of the plurality of base stations in response to an occurrence of an event.

9. The relay station according to claim 8, wherein the controller determines a plurality of sets, wherein each set of the plurality of sets comprises one or more antenna elements of the plurality of antenna elements associated with one or more base stations of the plurality of base station, and switches from a currently wirelessly connected set of the plurality of sets to another set of the plurality of sets in response to the occurrence of the event.

10. The relay station according to claim 8, wherein the event comprises measurement data of communications between the plurality of antenna elements and the plurality of base stations.

11. A relay method of a relay station that includes: a multi-element antenna including a plurality of antenna elements, comprising:

wirelessly connecting a first antenna element of the plurality of antenna elements to a first base station of a plurality of base stations;

wirelessly connecting a second antenna element, being different from the first antenna element among the plurality of antenna elements, to a second base station being different from the first base station of the plurality of base stations; and wirelessly connecting, via the relay station, at least one of the first antenna element wirelessly connected to the first base station and the second antenna element wirelessly connected to the second base station, to another base station of the plurality of base stations in response to an occurrence of an event.

12. The relay method to claim 11, further comprising:

determining a plurality of sets, wherein each set of the plurality of sets comprises one or more antenna elements of the plurality of antenna elements associated with one or more base stations of the plurality of base station; and switching from a currently wirelessly connected set of the plurality of sets to another set of the plurality of sets in response to the occurrence of the event.

* * * * *